United States Patent [19]
Cho

[11] Patent Number: 5,934,305
[45] Date of Patent: Aug. 10, 1999

[54] METHOD OF MANUFACTURING A RECIPROCATING COMPRESSOR

[75] Inventor: Jung-Chang Cho, Seoul, Rep. of Korea

[73] Assignee: Samsung Electronics Co., Ltd., Suwon, Rep. of Korea

[21] Appl. No.: 09/100,234

[22] Filed: Jun. 19, 1998

Related U.S. Application Data

[62] Division of application No. 08/710,188, Sep. 12, 1996, Pat. No. 5,769,126.

[51] Int. Cl.$^6$ .................................................... F16K 15/16
[52] U.S. Cl. ............................ 137/15; 137/856; 137/857; 417/571
[58] Field of Search ...................... 137/856, 855, 137/857, 15; 417/565, 569, 571

[56] References Cited

U.S. PATENT DOCUMENTS

| | | | |
|---|---|---|---|
| Re. 32,651 | 4/1988 | Romer . | |
| 2,000,883 | 5/1935 | Cullen et al. . | |
| 2,118,356 | 5/1938 | Money | 137/856 |
| 2,848,157 | 8/1958 | Ayling | 417/571 |
| 2,859,912 | 11/1958 | Swart et al. | 417/571 |
| 2,935,248 | 5/1960 | Gerteis | 417/571 |
| 4,628,963 | 12/1986 | Ishijima et al. . | |
| 4,642,037 | 2/1987 | Fritchman | 417/571 |
| 5,110,272 | 5/1992 | Peruzzi et al. . | |
| 5,178,183 | 1/1993 | Kim . | |
| 5,209,260 | 5/1993 | Baek . | |
| 5,379,799 | 1/1995 | Kawai et al. | 137/856 |
| 5,466,129 | 11/1995 | Fukai | 137/856 X |
| 5,558,508 | 9/1996 | Sasano . | |
| 5,601,118 | 2/1997 | Jang . | |

Primary Examiner—Denise Le Ferensic
Assistant Examiner—Ramyar Farid
Attorney, Agent, or Firm—Burns, Doane, Swecker & Mathis, L.L.P.

[57] ABSTRACT

A reciprocating compressor includes a compression chamber in which a piston compresses gas, the gas being discharged through a discharge hole that is normally closed by a valve assembly. The valve assembly includes a valve plate on which one end of a discharge valve is anchored. The discharge valve includes an elastically flexible portion for covering the discharge hole. A stopper valve is positioned behind the discharge valve for limiting the extent of movement of the discharge valve. A keeper member is disposed behind the stopper valve to retain the stopper valve and discharge valve in place. One end of the keeper member is fixed to the valve plate by a pin, and the other end of the keeper member is fixed to the valve plate solely by a pressing force of a cylinder head.

1 Claim, 4 Drawing Sheets

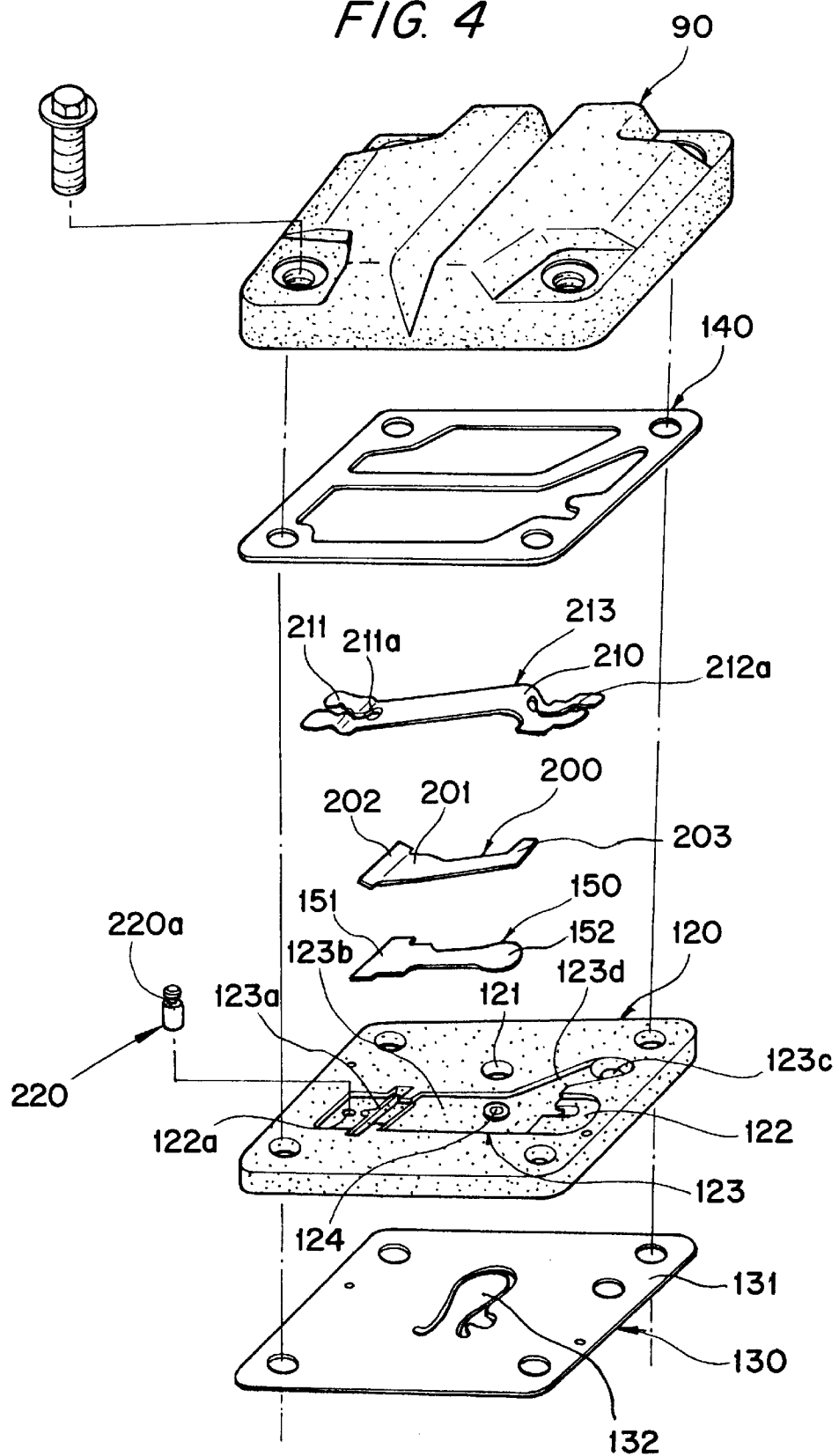

METHOD OF MANUFACTURING A
RECIPROCATING COMPRESSOR

This application is a Divisional of application Ser. No. 08/710,188, filed Sep. 12, 1996, now U.S. Pat. No. 5,769,126.

BACKGROUND OF THE INVENTION

1. Field of the Invention

The present invention relates to a valve apparatus of an enclosed reciprocating compressor, and more particularly to the valve apparatus therefor which opens and closes a discharge hole for compressed gas.

2. Description of the Prior Art

A conventional enclosed reciprocating compressor includes, as illustrated in FIG. 1, driving means 20 having a rotor 21 and a stator 22 disposed at an upper side in an upper and a lower case 10 and 11, a crank axis 40 having an eccentric unit 41 disposed at an inner lower side of the rotor 21 through the medium of a bearing 30 and an oil pickup tube 50 disposed at a lower end of the eccentric unit 41 for being eccentrically moved by turning effect of a crank shaft 40 and for picking up oil (o) stored at a lower side in a lower case 11 to thereby supply the oil to the eccentric unit 41 and a spiral groove 42 formed at the crank shaft 40.

The eccentric unit 41 of the crank shaft 40 is disposed with a connecting rod 60 for receiving an eccentric movement according to the turning effect of the crank shaft 40 to thereby convert the movement to horizontal reciprocating movement.

The connecting rod 60 is disposed at a tip end thereof with a piston 80 for moving horizontally and reciprocally in a cylinder block 70 mounted at one side in the lower case 11.

The cylinder block 70 is arranged at one side thereof with a cylinder head 90 having suction and discharge chambers 91 and 92 for high pressurized gas to be sucked in and discharged there through.

Furthermore, the suction chamber 91 is provided at one side thereof with a silencer 100 for attenuating moise generated in the course of mixed gas being sucked in, and is arranged at the other side thereof with a capillary tube 110 for supplying the oil (o) stored at a lower side in the lower case 11 to the suction chamber 91 when a piston 80 is horizontally and reciprocating moved in the cylinder block 70.

Meanwhile, a valve plate 120 having a suction inlet 121 is disposed between the cylinder block 70 and the cylinder head 90.

A suction valve 130 is disposed between the cylinder block 70 and the valve plate 120 for being opened and closed by pressure generated by the high pressurized gas sucked from the suction chamber 91 to the cylinder block 70 when the piston 80 is moved to a bottom dead center.

Gaskets 140 are respectively provided between the cylinder head 90 and the valve plate 120 and between the cylinder block 70 and suction valve 130.

At this time, the valve plate 120 is concavely formed at an upper center area thereof with a first accommodation unit 122 for accommodating a keeper member 170 to accurately place a discharge valve 150 and a stopper valve 160 at a predetermined position.

The first accommodation unit 122 is centrally formed with the charge valve 150 for being opened and closed by pressure generated by the high-pressurized gas discharged from the cylinder block 70 to the chitchatted chamber 92 when the piston 80 is moved to an upper dead point, and is also concavely formed with a second accommodation unit 123 for accommodating the stopper valve 160 so that the discharge valve 150 thereof can be restricted in area of closing and opening.

The second accommodation unit 123 is centrally arranged with a discharge hole 124 for discharging the high pressurized gas from the cylinder block 70 to the discharge chamber 92.

In other words, the second accommodation unit 123 is formed at one end thereof with a support groove 123a for accommodating respective valve fixing units 151 and 161 formed at tip ends of the discharge valve 150 and the stopper valve 160 to thereby allow valve movement units 152 and 162 disposed at the other tip ends to vertically move to the left and right directions without being swayed.

The second accommodation unit 123 is also formed at the other end thereof with a support space 123b having a discharge hole 124 at a central portion thereof in order to allow the high-pressurized gas to be discharged from the cylinder block 70 to the discharge chamber 92 and to allow the valve movement unit 152 at the discharge valve 150 to be opened and closed while being smoothly and vertically moved.

At this time, the stopper valve 160 is formed with a bend unit 163 between the valve fixing unit 161 and the valve movement unit bent at a predetermined angle so as to limit an opened degree of the discharge valve 150 and to alleviate trembling of the discharge valve 150.

The bend unit 163 serves to press straightly on an upper surface of the discharge valve 150 by way of a line contact.

Meanwhile, the keeper member 170 is respectively formed at both ends thereof with bend units 171 symmetrically disposed at predetermined angles, being bent more than a central potion thereof, for being mounted at both ends of the first accommodation unit of the valve plate 120 to thereby press the valve fixing units 151 and 161 of the stopper valve 160 and the discharge valve 150.

When the piston 80 in the cylinder block 70 thus constructed is moved to an upper dead center, gas in the cylinder block 70 is compressed and at the same time, the valve movement unit 132 at the suction valve 130 returns to an original position according to pressure of high-pressurized gas compress thereby to thereby same to contact the suction hole 121 at the valve plate 120 and to close the hole 121.

Furthermore, the valve movement unit 152 of the discharge valve 150 which has blocked the discharge hole 124 is laid aside by pressure of the compressed high-pressured gas to thereby hit the valve movement unit 162 of the stopper valve 160, and the stopper valve 160 is retracted by the impact thereof until same reaches the keeper member 170, whereby the high-pressurized gas in the cylinder block 70 is discharged to the discharge chamber 92 of the cylinder head 90 through the discharge hole 124 of the valve plate 120.

When the discharge of high-pressurized gas is finished and the piston 80 is moved to a bottom dead center the valve movement unit 152 of the discharge valve 150 is returned to the original position by the resilient force of the stopper valve 160 and the restoring force of the discharge valve 150, thereby contacting the discharge hole 124 of the valve plate 120 and closing the hole 124.

When suction valve 130 is opened by vacuum pressure generated in the course of the piston 80 being moved to the bottom dead center, the gas in the suction chamber 91 at the cylinder head 90 is sucked into the cylinder head 70 through the suction hole 121, and therefore compression and discharge strokes are repeated.

However, there is a problem in the valve apparatus of an enclosed reciprocating compressor thus constructed in that, because a tip end of the valve movement unit 162 formed at the stopper valve 160 is always in touch with a bent shape of the bend unit 171 formed at the keeper member 170 during the suction stroke and discharge stroke of the high-pressurized gas, as illustrated in FIG. 3, the valve movement 162 of the stopper valve 160 performs an irregular movement according to pressure change during the discharge stroke and at the same time, abrades the keeper member 170 to thereby generate noises.

Furthermore, there is another problem in that, because the keeper member 170 is structured such that both ends thereof are mounted to the first accommodation unit 122 of the valve plate 120 and then assembled into a space between the valve plate 120 and the cylinder head 90 when they are assembled, the keeper member 170 is easily displaced by pressure change during the discharge stroke, to thereby prevent the discharge valve 150 and the stopper valve 160 from being steadily pressed so that there is generated a heavy vibration (trembling) of the discharge valve 150 and the stopper valve 160, and there possibly occurs detachment of the discharge valve 150 and the stopper valve 160.

SUMMARY OF THE INVENTION

Accordingly, the present invention is presented to solve the aforementioned problem and it is an object of the present invention to provide a valve apparatus of an enclosed reciprocating compressor by which a discharge valve and a stopper valve are retained by pressing pressure of a keeper member and at the same time, and opening resistance of the discharge valve is minimized by a shape of the keeper member and the stopper valve during discharge of the high-pressurized gas and movement thereof is stabilized to thereby minimize generation of vibration (trembling phenomenon) and noise, and flow of the discharged high-pressurized gas is expedited by way of a groove and an exit hole formed in a valve plate.

In accordance with the objects of the present invention, there is provided a valve apparatus of an enclosed reciprocating compressor, the apparatus comprising:

a valve plate disposed between a cylinder block and a cylinder head so that gas can be sucked in and discharged;

a discharge valve for opening and closing a discharge hole of the valve plate;

a stopper valve for being mounted to a second accommodation unit of the valve plate to limit an opened height of the discharge valve and to close same; and a keeper member for being mounted to a first accommodation unit of the valve plate in order to press the discharge valve and the stopper valve and for being supportively fixed at one side thereof through the medium of fixing pin and being supportively fixed at the other side thereof by a tripping jaw during assembly of a cylinder head.

BRIEF DESCRIPTION OF THE DRAWINGS

For a fuller understanding of the nature and objects of the invention, reference should be made to the following detailed description taken in conjunction with the accompanying drawings in which;

FIG. 4 is an exploded perspective view for illustrating a cylinder head according to the present invention;

DETAILED DESCRIPTION OF A PREFERRED EMBODIMENT OF THE INVENTION

Now, a preferred embodiment of the present invention will be described in detail with reference to the accompanying drawings.

Figure 1:
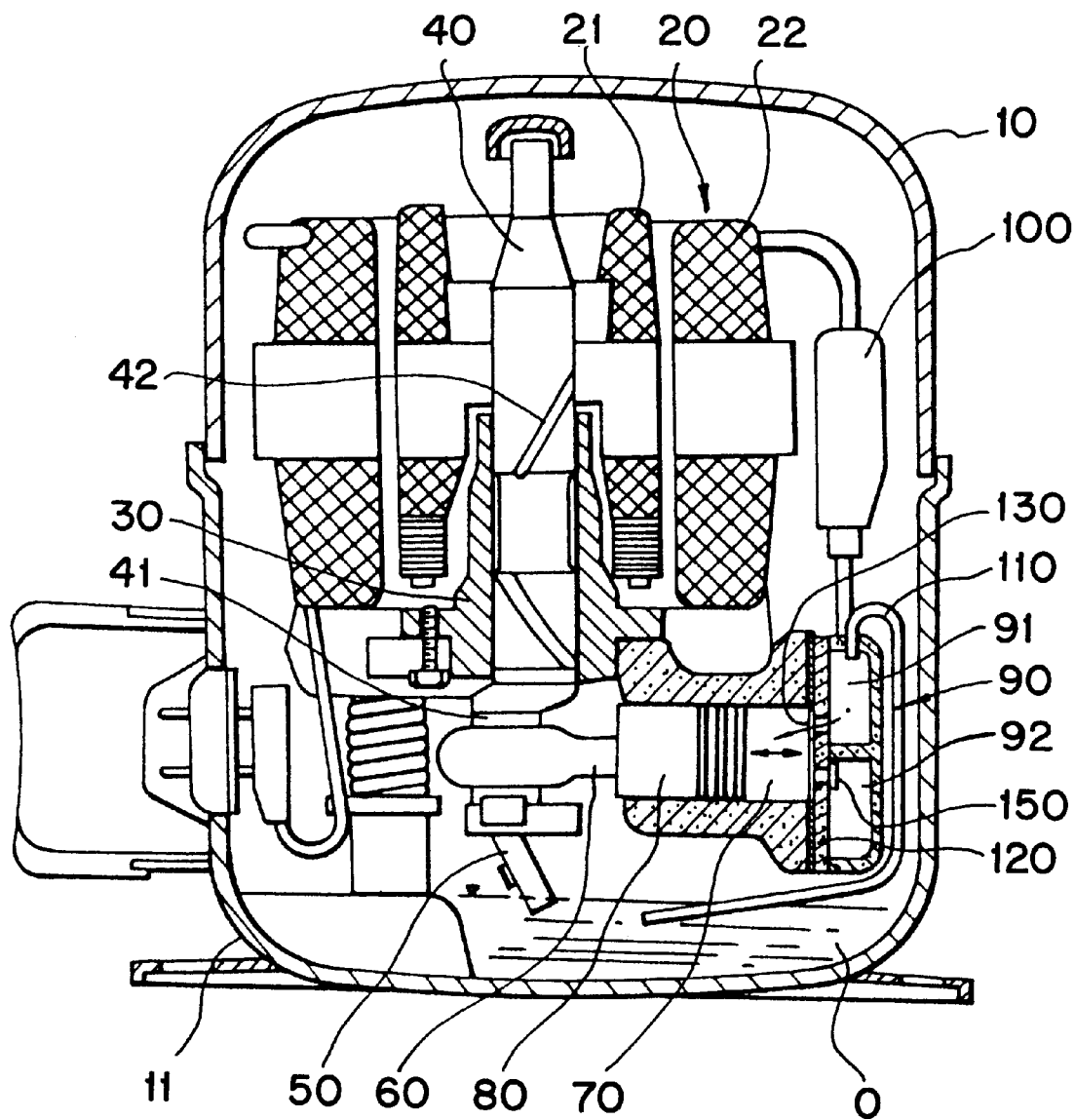
FIG. 1 is an overall sectional view for illustrating a conventional enclosed compressor.
Figure 2:
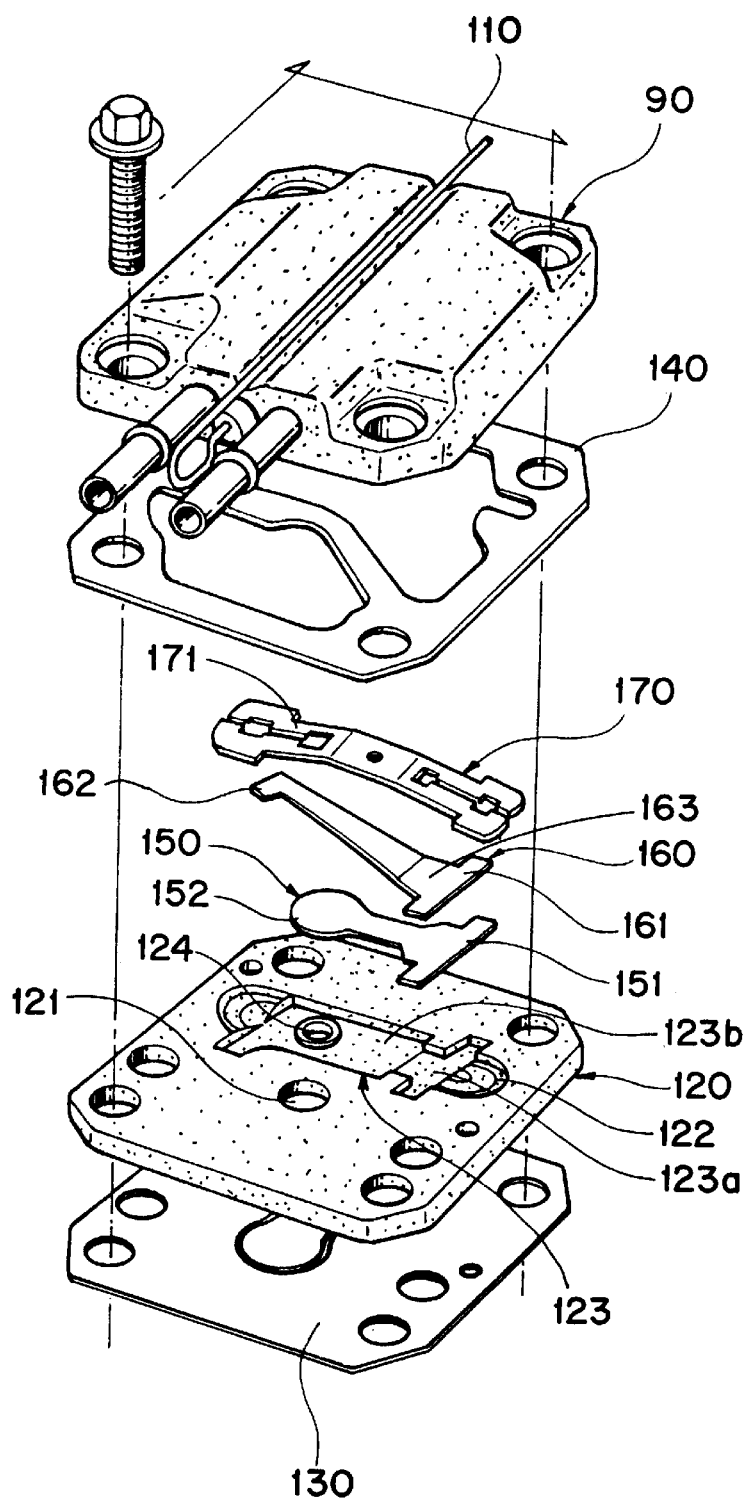
FIG. 2 is an exploded perspective view for illustrating a conventional cylinder head.
Figure 3:
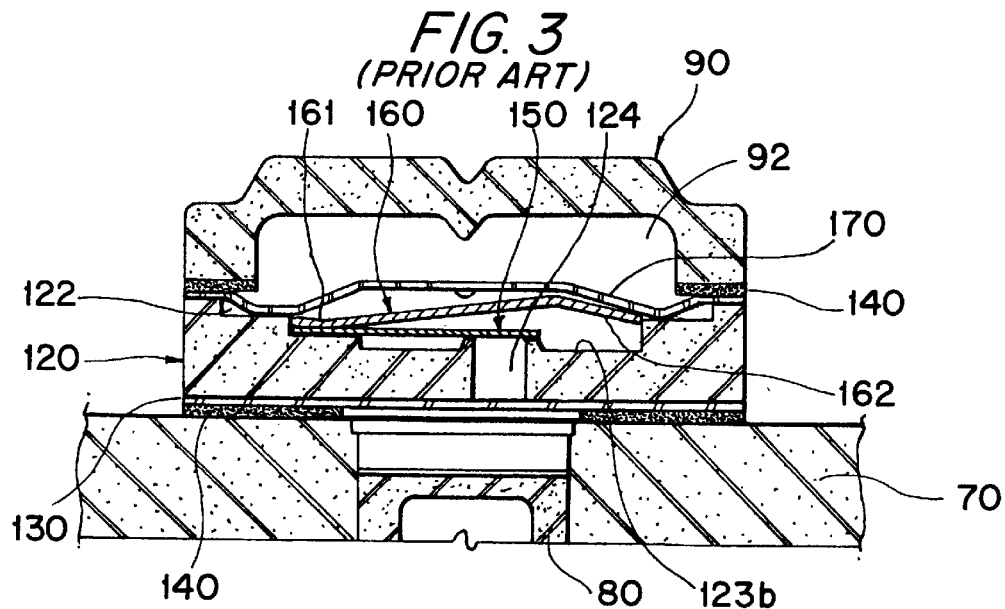
FIG. 3 is a sectional view for illustrating an assembly of a conventional cylinder block and head.

Throughout the drawings, like reference numerals and symbols are used for designation of like or equivalent parts or portions as in FIGS. 1, 2 and 3 for simplicity of illustration and explanation. and redundant explanations are omitted accordingly.

Figure 7:
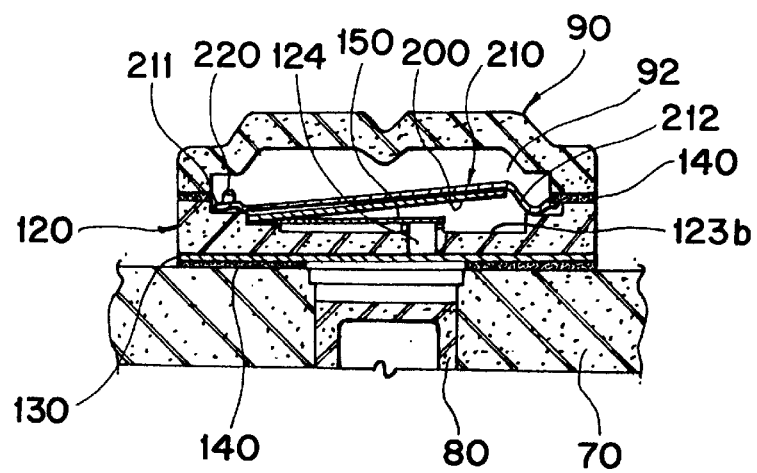
FIG. 7 is a sectional view for illustrating an assembly of a cylinder block and head according to the present invention.

As illustrated in FIGS. 4 and 7, a discharge valve plate 120 having a suction hole 121 is disposed between a cylinder block 70 and a cylinder head 90, and a suction valve 130 is disposed between the cylinder block 70 and the valve plate 120 so as to be opened and closed by pressure of the high-pressurized gas sucked from a suction chamber 91 to the cylinder block 70 when a piston 80 is moved to a bottom dead center.

Gaskets are respectively disposed between the cylinder head 90 and the valve plate 120, and between the cylinder block 70 and the suction valve 130 in order to prevent the high-pressured gas from being leaked.

In other words, the valve plate 120 is concavely formed at a central upper surface thereof with a first accommodation or recess 122 having a pin fixing hole 122a at a left side thereof so that a keeper member 210 can be fixed at a left end thereof through the medium of a fixing pin 220 and both ends thereof can be mounted to retain a discharge valve 150 and a stopper valve 200 at predetermined positions in front of the keeper member.

The accommodation unit 122 is concavely formed at a central portion thereof with a second accommodation unit 123 for accommodating a discharge valve 150 for being opened and closed by pressure of the high-pressurized gas discharged from the cylinder block 70 to the discharge chamber 92 when the piston 80 is moved to an upper dead center and at the same time for accommodating the stopper valve 200 for limiting an opened and closed angle of the discharge valve 150.

The second accommodation unit 123 is centrally formed with a discharge hole 124 for the high-pressurized gas to be discharged from the cylinder block 70 to the discharge chamber 92.

At this time, the second accommodation unit 123 is formed at one end therof with a support groove 123a for being accommodated with valve fixing units 151 and 201 respectively formed at side ends of the discharge valve 150 and the stopper valve 200 to thereby allow valve movement units 152 and 202 disposed at the other end thereof to perform vertical movement without being swayed to the left and to the right directions.

The second accommodation unit 123 is formed at the other end thereof with a support space 123b having a discharge hole 124 at a central portion thereof so that the high-pressurized gas can be discharged from the cylinder block 70 to the discharge chamber 92 and the valve movement unit 152 at the discharge valve 150 can be expedited in vertical movement and can be opened and closed when the piston 80 is moved from the bottom dead center to the upper dead center.

The support space 123b is formed at one side thereof with a groove 123d having a discharge pass hole 123c.

Figure 5:
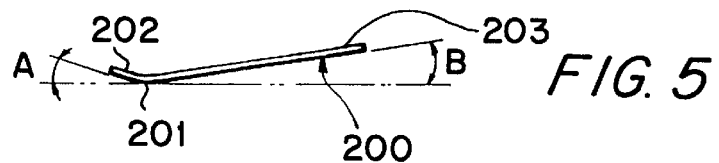
FIG. 5 is a detailed drawing of a stopper valve according to the present invention.

Meanwhile, the stopper valve 200, as illustrated in FIG. 5, is formed with a plain surface contact unit 201 so as to be tightly contacted with an upper area of the discharge valve 150 to thereby press same.

The surface contact unit 201 is integrally formed at a left side thereof with a valve fixing unit 202. being upwardly bent at a predetermined slant angle (A) so as to be mounted at the support groove 123a formed at the second accommodation unit 123 of the valve plate 120 and at the same time, to be fixedly pressed by the keeper member 210.

The surface contact unit 201 is integrally formed at a right side thereof with a valve movement unit 203 being upwardly bent at a predetermined slant angle (B) in order to limit an opening operation of the discharge valve 150.

Figure 6:
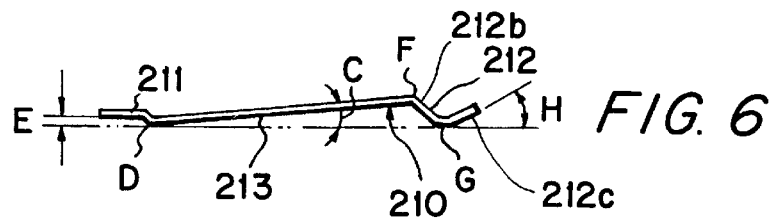
FIG. 6 is a detailed drawing of a keeper member according to the present invention.

Furthermore, the keeper member 210 as illustrated in FIGS. 4 and 6 is curvedly formed with a staired unit 211 bisected by a circular cut groove 211a which is insertable into a groove 220a of a fixing pin 220 so that the keeper member 210 can accomodate the fixing pin 220 fixed in the pin fixing hole 122a of the first accommodation recess 122.

The keeper member 210 is also formed with a bend unit 212 bisected by a cut groove 212a at a right end thereof to a right end of the first accommodation unit 122 formed at the valve plate 120 and supportively fixed by pressing of gaskets 140 during assembly of the cylinder head 120.

The keeper member 210 is formed with a middle unit 213 having a predetermined angle (C) so as to allow the elevation thereof to become larger as it goes from the staired unit 211 to the bend unit 212.

At this time, the staired unit 211 is curvedly formed so that a free end thereof is spaced at a predetermined height (E) from a slant start point edge (D) of the middle unit 213.

Furthermore, the bend unit 212 is disposed such that a curved bend 212b is formed downwardly from a slant end point (F) of the middle unit 213 to thereby allow a curved lower corner (G) to be positioned at the same horizontal level as the slant start point (D), and, at the same time, the bend unit 212 includes a portion 212c bent upwards at a slant from the curved lower corner (G) at a predetermined slant angle (H).

Next, the operational effect of the present invention thus constructed will be described.

When the stator 22 of the driving means 20 is applied with power according to activation of the compressor, a magnetic force is generated at a gap between the stator 22 and the rotor 21 to thereby rotate the rotor 21.

A crank shaft 21 is supportively fixed through the medium of a bearing and is rotated by a turning effect of the rotor 21 to eccentrically rotate an eccentric unit 41 formed at a bottom end of the crank shaft 40 and at the same time to eccentrically rotate an oil pickup tube 50 mounted underneath the eccentric unit 41.

At this time, when the oil pickup tube 50 is eccentrically rotated, oil (O) stored in a lower case 11 is picked up along the oil pickup tube 50 by surface tension generated by a slant angle of the oil pickup tube 50, and some portion of the oil (O) is infused to a contact surface of the eccentric unit 41 and a connecting rod 60 through an oil passage (not shown) leading to a peripheral surface of the eccentric unit 41 to thereby reduce frictional resistance.

Furthermore, the oil (O) is raised and picked up along a spiral groove 42 of the crank shaft 40 connected to an oil passage of an eccentric unit 30 to thereafter be evenly dispersed on a peripheral surface of the crank shaft 40, and, at the same time, is infused into a contact gap of a bushing (not shown) which contacts the bearing 30, to thereby reduce frictional resistance.

Meanwhile, when the eccentric unit 41 is eccentrically rotated, the connecting rod 60 disposedly connected to the eccentric unit 41 simultaneously performs horizontal and reciprocating motion, and the piston 80 disposed at a tip and thereof is operated to reciprcatingly move between an upper dead center and a bottom dead center of the cylinder block 70.

In other words, when the piston 80 is moved from an upper dead center and a bottom dead center, the valve movement unit 132 of the suction valve 130 is opened by an inner vacuum state of the cylinder block 70, to thereby cause mixed gas in the suction chamber 91 at the cylinder head side to be sucked into the cylinder block 70 through the suction hole 121 of the valve plate 120.

The oil (O) stored in the lower case 11 is infused into the suction chamber 91 through a capillary tube 110 connected to the suction chamber 91 by vacuum suction force, and, at the same time, is pulverized to thereafter be sucked into the cylinder block 70 together with the mixed gas.

Furthermore, when the piston 80 is moved from a bottom dead center to an upper dead center, the mixed gas in the cylinder block 70 is compressed and at the same time, and the discharge valve 150 is opened by compressing force thereof to thereby cause the high-pressurized gas compressed in the cylinder block 70 is discharged to a discharge chamber 92 of the cylinder head 90 through the discharge hole 124.

In other words, when the discharge valve 150 is opened by the high-pressurized gas discharged through the discharge hole 124 of the valve plate 120, the valve movement unit 152 of the discharge valve 150 hits a valve movement unit 203 of the stopper valve 200, and an opened degree thereof is restrained to thereby guide discharge of the compressed high-pressurized gas.

When the discharge of the high-pressurized gas is completed, the discharge valve 150 is closed by restoring force of the discharge valve 150 and resilient force of the valve movement unit 203 at the stopper valve 200, thereby closing the discharge hole 124 of the valve plate 120.

At this time, a plain surface contact unit 201 of the stopper valve 200 serves to tightly surface-contact an upper surface of the discharge valve 150 at a broad spacing to thereby cause the discharge valve 150 to press the valve plate solidly according to pressing action of the keeper member 210, so that an opening resistance of the valve movement unit 152 of the discharge valve 150 can be minimized, and vibration thereof will not be transmitted to the valve fixing unit 151.

Furthermore, the keeper member 210 is mounted at the staired unit 211 of the left end thereof to the first accommodation unit 122 of the valve plate 120 to thereby be supportively fixed through the medium of a fixing pin 220.

The keeper member 210 is pressed at a bend unit 212 of the right end thereof by pressing of the gaskets 140 when the cylinder head 90 is assembled and is supportively fixed.

The keeper member 210 is so shaped as to accommodated the valve movement unit 203 of the stopper valve 200 in the middle unit 213 thereof, so that the discharge valve 150 and the stopper valve 200 cannot be detached therefrom, and the stopper valve 200 is prevented from being bent or from generating fricictional noise when in contact with a bottom surface of the middle unit 213.

As is apparent from the foregoing there is an advantage in the valve apparatus of an enclosed reciprocating compressor according to the present invention, in that a stopper valve and a discharge valve are caused to be surface-contacted and a keeper member is solidly and supportively fixed at a left end thereof to one side of a valve plate through the medium of a fixing pin to thereby press the stopper valve and the discharge valve, so that the discharge valve and the stopper valve cannot be detached therefrom , and at the same time an opening resistance of the discharge valve can be minimized due to the shape of the keeper member and the stopper valve and movement thereof can be stabilized to thereby minimize vibration (trembling phenomenon) and generation of noise. Also, the flow of the high-pressurized gas discharged through the discharge exit hole 123(c), to which a groove 123(d) leads, provides for a smooth discharge of gas.

What is claimed is:

1. A method of manufacturing a reciprocating compressor comprising a cylinder block forming a compression chamber; a cylinder head connected to the cylinder block and forming a discharge chamber; a discharge valve plate disposed between the cylinder block and cylinder head and forming a discharge hole for conducting compressed gas from the compression chamber to the discharge chamber; and a valve apparatus mounted on the discharge valve plate and comprising: a discharge valve including a first fixed end portion and a first elastically movable portion extending from the first fixed end portion for normally lying against and blocking the discharge hole and for being flexed away from the discharge hole under the force of compressed gas in the compression chamber; a stopper valve mounted behind the discharge valve and including a second fixed end portion arranged to press against the first fixed end portion, and a second movable portion extending from the second fixed end portion and against which the first movable portion can abut, to limit the extent of opening of the discharge valve; and a keeper member disposed behind the stopper valve for retaining the stopper valve and discharge valve in place, the keeper member including a third fixed end portion fixed to the discharge valve plate by a fixing pin, and a fourth fixed end portion fixed to the valve plate solely by a pressure force of the cylinder head; the method comprising the steps of:

(A) providing the discharge valve plate with an accommodation recess and a pin-fixing hole disposed in the accommodation recess, the accommodation recess opening in a direction away from the cylinder block;

(B) providing the third fixed end portion of the keeper member with a stepped configuration having a first groove formed therein the groove extending from an edge of the third fixed end portion;

(C) providing the fixing pin with a second groove;

(D) sliding the second groove of the fixing pin into the first groove of the keeper member and installing the fixing pin into the pin fixing hole to fix the third fixed end portion within the accommodation recess, with the discharge valve and the stopper valve disposed between the keeper member and the discharge valve plate, and with the first and second fixed ends spaced from the fixing pin in a direction toward the discharge hole; and (E) installing the cylinder head to the cylinder block in non-engaging relationship with the fixing pin, whereby the cylinder head presses against the fourth fixed end portion of the keeper member.

* * * * *